Inventors
Ernst Theunissen
Hans-Eckhard Sass

By *Attorneys*

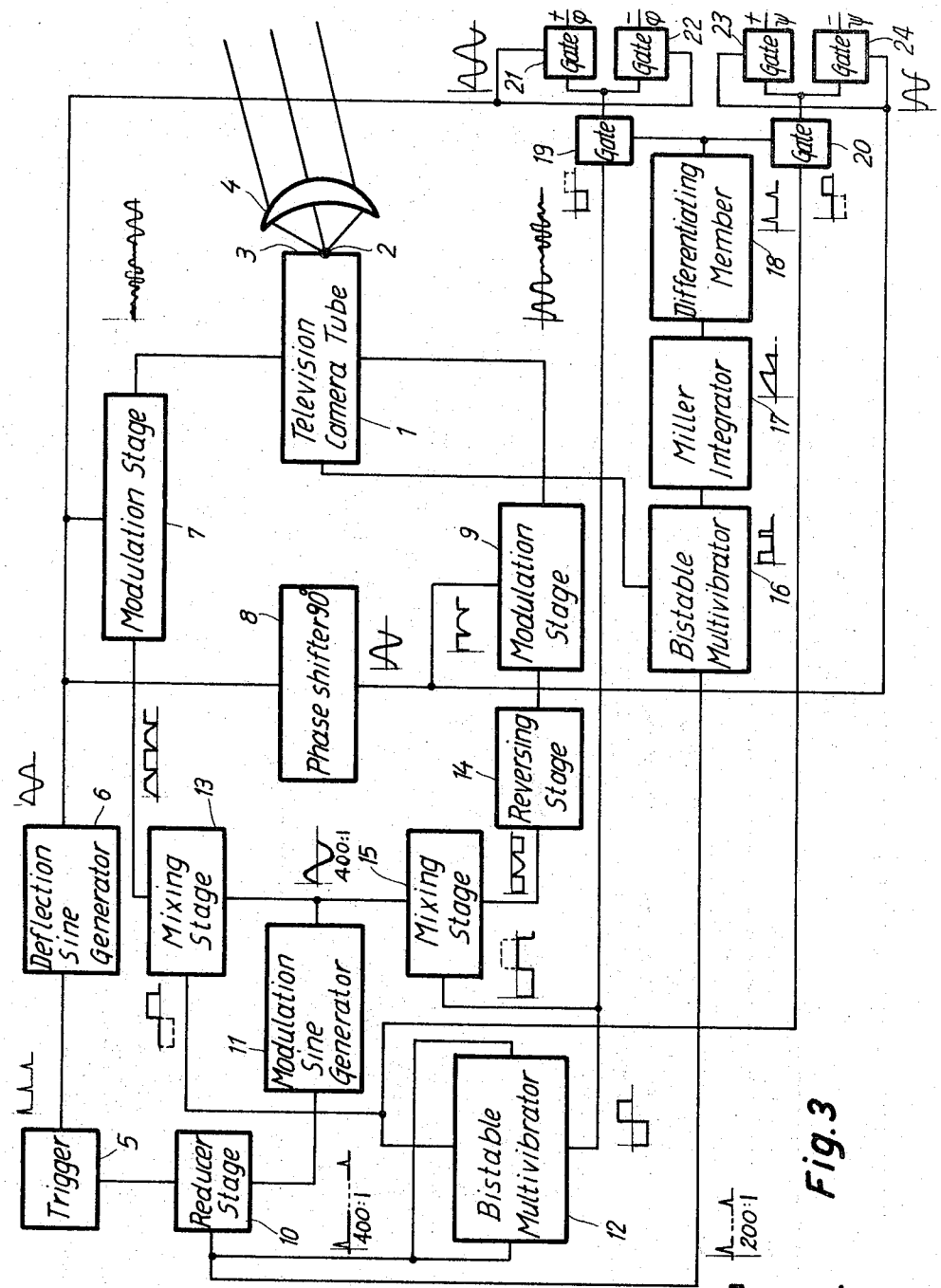

3,339,452
METHOD AND APPARATUS FOR DETERMINING THE DEVIATION ANGLE OF AN AXIS INTENDED TO BE ALIGNED WITH A CELESTIAL BODY

Hans-Eckhard Sass, Munich, and Ernst Theunissen, Ottobrunn, near Munich, Germany, assignors to Bolkow Gesellschaft mit beschrankter Haftung, Ottobrunn, near Munich, Germany
Filed Sept. 24, 1964, Ser. No. 398,804
Claims priority, application Germany, Sept. 25, 1963, B 73,639
13 Claims. (Cl. 88—14)

This invention relates to the determination of deviation angles of an axis intended to be aligned on a celestial body. More particularly, the present invention is directed to a novel, simplified and less expensive method and apparatus for determining the deviation angles of such an axis with respect to the theoretical axis or line of sight intersecting the celestial body.

Methods and apparatus of the mentioned type are used quite extensively in the guidance of flying objects. In such guidance apparatus, it is known to use control devices wherein a celestial body is reproduced as an image point on the screen of a television camera, such reproduction being effected by means of an optical system. These control devices are used to determine the deviation angles of an optical axis, intended to be aligned on the celestial body, from a theoretical axis extending from the celestial body and through the optical system. The angular deviations are determined by scanning the screen of the television camera tube electronically, with the angular deviations being calculated from the picture signal obtained.

The electronic scanning arrangements used in known control devices require complicated electronic computers for deriving signals which are directly proportional to the angular deviations to be measured. These computers are expensive for the reason that known scanning methods require coordinate transformations which are not feasible using simple electronic means. Furthermore there is a disadvantage in known methods and apparatus for this purpose as they are desgined for a narrow deviation angle range. Thus they are unable, or able only at still greater cost of the computing means, to furnish deviation angle signals for all deviation angles that occur in the reproduction of a celestial hemisphere.

An object of the present invention is to provide a scanning method of the aforementioned type which is free of disadvantages of the prior art and which involves the use of relatively inexpensive, simple electronic means.

Another object of the invention is to provide a scanning apparatus which is free of the disadvantages of the prior art and which employs relatively simple and inexpensive electronic means for determining the deviation angle or angles.

A further object of the invention is to provide a method of the aforementioned type in which there may be used an optical system whose image angle may be up to 180°, or which may be any desired smaller value.

Still another object of the invention is to provide a method and apparatus for scanning the picture screen of a television camera tube in which scanning is effected by two families of ellipses whose major axes are normal to each other and whose minor axes are constantly varied, as a sine function, between a zero value and a circle whose radius is the major semi-axis of the respective ellipse.

Still another object of the invention is to provide such a scanning arrangement in which the time interval between the value zero of a minor semi-axis of a scanning ellipse and the passage of the scanning ellipse through an image point is a direct measure of the magnitude of a deviation angle.

Yet another object of the invention is to provide a method and apparatus using an optical system whose image angles may be up to 180° or whose image angle may be any desired smaller angle, and wherein, when the optical system has an image angle less than 180°, scanning of the image screen occurs with a segment from the ellipse family selected according to the smaller image angle.

The apparatus for implementing the method of the invention can be adapted, at relatively low cost, to scanning using present optical systems. Thus, the television camera tube is overmodulated by the deflecting voltages applied to the pairs of deflection plates. Using known means for regulating the amplitudes of the deflection voltages, it is thus possible to provide, for every optical system, a suitable segment from the ellipse family used in scanning the image field.

Furthermore the apparatus for producing signals proportional to the deviation angles or deflection angles can utilize known electronic means. In a preferred form of embodiment of the invention there is provided a television camera tube to whose X-deflection pair of plates there is applied a sinusoidal deflection voltage modulated by a pulse voltage formed by alternating positive sinusoidal half-waves and rectangular pulses of equal amplitude and period. To the Y-deflection pair of plates, the deflection voltage is applied phase-displaced by 90°, and modulated by the pulse voltage phase-displaced by 180°. The frequency of the deflection voltage is so selected that the scanning speed is very high with relation to the emigration speed of the image of a celestial body, reproduced as an image point on the picture screen by means of an optical system, and the frequency of the waves forming the pulse voltage is small in comparison with the frequency of the deflection voltages.

In accordance with a further feature of the invention, a high time constant for stabilizing means is attained at low cost by using a sine generator controlled by a frequency-stable trigger. This sine generator is connected, through a modulation stage, to the X-deflection pair of plates and, through a 90° phase shifter and another modulation stage, to the Y-deflection pair of plates. Such application is effected by a bistable deflection multivibrator controlled by the trigger frequency reduced by one-half through a frequency reducer. The modulation stage of the X-deflection is connected, through a mixing stage, with the modulation sine generator and with an output of a bistable deflection multivibrator. The modulation stage of the Y-deflection is connected through a reversing stage and another mixing stage to the modulation sine generator and to the other output of the bistable deflection multivibrator.

As a still further feature of the invention, unambiguous correlation of the received signals with respect to four outputs of the apparatus is effected by providing that signals coming from the television camera tube are supplied to a bistable signal multivibrator which is controlled by the frequency reducer with twice the frequency of the modulation sine generator. The output of this signal multivibrator is connected through a Miller integrator and a differentiating member to two gates controlled by the outputs of the deflection multivibrator. The output of each gate is connected to a respective pair of gates, with one pair of gates being controlled with the frequency of the deflection sine generator and the other gate pair being controlled with the frequency of the deflection sine generator phase-displaced by 90°. The outputs of the gates of the two pairs are voltages proportional to the respective determined deviation angles.

For an understanding of the principles of the invention, reference is made to the following description of a typical embodiment thereof as illustrated in the accompanying drawings.

In the drawings:

FIG. 3 is a block diagram of one form of apparatus for practicing the invention method.

Figure 1:
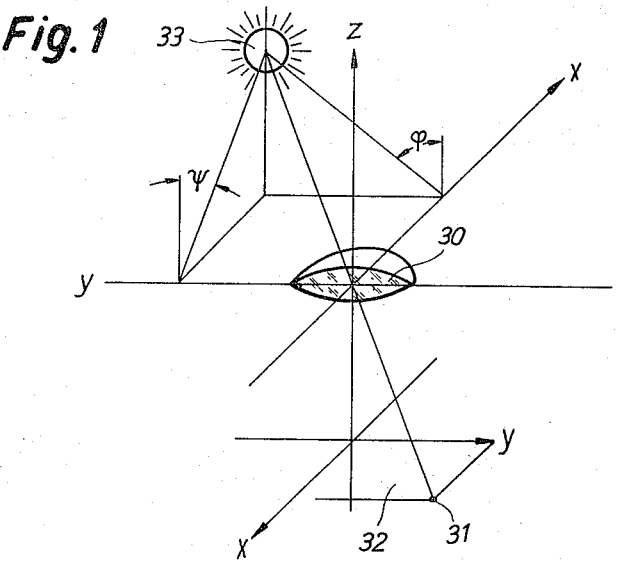
FIG. 1 is a diagram illustrating the geometrical principles underlying the invention.

Referring to FIG. 1, a projection objective 30, positioned at the intersection of the three dimensional coordinate system $x, y, z$, produces, in the image plane 32 of coordinate system XY an image point 31 of a celestial body 33. Alignment of the axis designated to be aligned on celestial body 33, and which is represented by the $z$ axis, can be effected by rotation of the $z$ axis about two axes at right angles to each other, namely the $x$ axis and the $y$ axis. For the purpose of providing position coordinates, it is advantageous to use two angles $\phi$ and $\psi$. These two angles may be defined as follows: $\phi$ is the angle between the $x$–$z$ plane and the plane containing the $x$-axis and the vector pointing to the celestial body 33; $\psi$ is the angle between the $y$–$z$ plane and the plane which contains the $y$-axis and the vector pointing to the celestial body 33.

The devitation angles $\phi$ and $\psi$ are related with the coordinates XY of the image plane by the equations $$\phi = \arctan \frac{mY}{\sqrt{1-m^2(X^2+Y^2)}}$$

$$\Psi = \arctan \frac{mY}{\sqrt{1-m^2(X^2+Y^1)}}$$

This produces the ellipse equations $$X^2 + \frac{Y^2}{\sin 2\phi} = \frac{1}{m^2}$$

$$\frac{X^2}{\sin 2\Psi} + Y^2 = \frac{1}{m^2}$$

with $\phi$ and $\psi$ as parameters. The factor $m^2$ is a scale factor.

Figure 2:
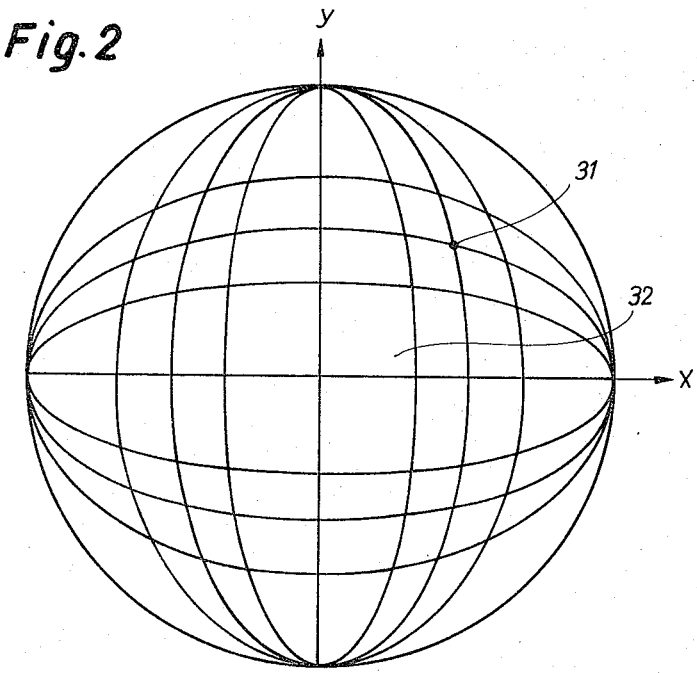
FIG. 2 is a diagram illustrating how the television camera tube is scanned by two families of ellipses.

If, and as shown in FIG. 2, the image field of the television camera tube is scanned in such a manner that, starting from a circular periphery, two families of ellipses are formed successively with the respective major axes of the ellipses at right angles to each other and with the respective minor semi-axes being constantly varied uniformly between a zero value and a circle whose radius is a major semi-axis of the scanning ellipse, then the time interval between the instant of value zero of such minor semi-axes and the passage of a scanning ellipse through the image point corresponding to the celestial body, is a direct measure of the amplitude of the angle $\phi$ or $\psi$. This is true if it is assumed that the variation of the minor axis occurs as a sine function.

Referring to FIG. 3 which is a block diagram of apparatus for implementing the invention method, a deflection sine generator 6, controlled by a frequency-stable trigger 5, generates a sinusoidal deflection voltage. This voltage is applied, through a modulation stage, to the pair of plates, in the television camera tube 1, controlling the X-deflection, and is applied to the pair of plates controlling the Y-deflection through a 90° phase shifter 8 and another modulation stage 9. Thus, there occurs initially a circular scanning of the picture screen 3 which is designed as a photo cathode.

To make the amplitudes of the deflection voltage variable, the two modulation stages 7 and 9 are provided. For example, each modulation stage may consist of an electronic valve having two control grids. The positive modulation is applied to one control grid which has a negative bias applied thereto. The sinusoidal deflection voltage is applied to the other control grid. The modulation voltage is supplied by the modulation sine generator 11 whose frequency is, for example, 400 times less than the frequency of deflection sine generator 6. Sine generator 11 is pulsed by the 400:1 reduced pulse derived by reducer stage 10 from trigger 5, and by a bistable deflection multivibrator 12 which is switched by the pulses of trigger 5, with a frequency reduced, for example, in the ratio of 200:1.

There are two mixing stages 13 and 15 each of which, in the simplest case, may comprise a diode circuit. In these mixing stages the positive half-waves of the output of modulation sine generator 11, and the positive rectangular pulse of bistable deflection multivibrator 12, or, respectively, the negative half-waves of the output of sine generator 11 and the negative rectangular pulse of the bistable multivibrator 16, are combined. Thus, at the outputs of mixing stages 13 and 15 there appear voltages, each of which is formed by sine form half-pulses and rectangular pulses, of equal duration and mutually phase displaced by 180°.

The pulse sequence of mixing stage 15 is reversed in polarity in a reversing stage 14, so that like voltages are applied to modulation stages 7 and 9 but displaced by 180°. The result is that the two voltages, for the X-deflection and for the Y-deflection, respectively, are fully applied alternately to the plates, while the other pair of plates is modulated sinusoidally with the deflection voltage being zero at the beginning of the modulation, then rising to its peak value, and again becoming zero. By this arrangement an elliptical scanning of the picture screen can be effected.

Therefore, during a half-vibration of the modulating sine generator 11, there will appear at the output of the television camera tube two image signals of which only the first is used for the determination of the respective coordinate, as the "time distance" of this signal from the zero point of the sinusoidal modulation voltage is, for example, proportional to the deviation angle $\phi$. A similar effect is used for determining the deviation angle $\psi$. To determine this latter angle, as a measure of the "time distance," a bistable signal multivibrator is used which, like the deflection multivibrator 12, is triggered to one state by the 200:1 reduced trigger pulses and switched back to the other state by the image signal. The length of the rectangular pulse formed at the output of multivibrator 12 is thus proportional to $\phi$ or $\psi$ respectively. In the succeeding Miller integrator 17 connected to the output of multivibrator 16, this rectangular pulse is transformed into a saw-tooth voltage which is subsequently differentiated in the differentiating member 18 connected to the output of integrator 17.

A separation of the $\phi$ and $\psi$ information occurs in a following gating stage comprising gates 19 and 20. This is due to the fact that bistable deflection multivibrator 12 opens gate 19 precisely when the sinusoidal modulation of the respective coordinate takes place, while gate 20 is maintained closed. During the next half-wave or half-period, gate 20 is opened and gate 19 is closed. Thus a separation of the spike pulses, having amplitudes proportional to the respective angles $\phi$ and $\psi$, is effected.

However, with respect to each coordinate, it must still be determined whether the image point lies on the negative coordinate side or on the positive side. For this purpose another gating stage is provided comprising the gates 21, 22, 23 and 24. In accordance with the particular phase of the deflection voltage which happens to be available upon appearance of the spike pulse at the output of gate 19 or 20, gate 21 or 22 or, respectively, gate 23 or 24, is opened. The control voltages used are either the deflection voltages generated by deflection since generator 6, or, respectively, these deflection voltages displaced by 90°. Thus, in dependence upon the position of image point 2, there will appear at the outputs of gates 21, 22, 23 or 24, spike pulses whose amplitudes are proportional to the deviation angles $I\phi$ and $I\psi$, and which can be processed accordingly.

While a specific embodiment of the invention has been shown and described in detail to illustrate the amplification of the principles of the invention, it will be understood that the invention may be embodied otherwise without departing from such principles.

What is claimed is:

1. Apparatus for determining the deviation angles of the axis of a camera-lens system, intended to be aligned on a celestial body, with respect to the line intersecting the celestial body and the center of the lens, said apparatus comprising, in combination, a television camera including a picture tube having a picture screen whose screen axis constitutes the axis to be aligned; means for producing, on said screen, an image of the celestial body; scanning means operatively associated with said screen and effective to scan the same alternately with first and second families of ellipses whose major axes are equal and constant in length and perpendicular to each other and whose minor axes are constantly varied, between zero and a value equal to the respective major axes, as a sine function; and measuring means operatively associated with said scanning means, and operable to measure the time intervals between the value zero of the minor axis of the scanning ellipse and the instant the respective scanning ellipse intersects the image, to provide a direct measure of the magnitude of an axis deviation angle.

2. Apparatus for determining deviation angles of the axis of a camera-lens system, intended to be aligned on a celestial body, with respect to the line intersecting the celestial body and the center of the lens, said apparatus comprising, in combination, a television camera including a picture tube having a picture screen whose screen axis constitutes the axis to be aligned; an optical system for producing, on said screen, an image of the celestial body and including said lens; scanning means operatively associated with said screen and effective to scan the same alternately with first and second families of ellipses whose major axes are equal and constant in length and perpendicular to each other and whose minor axes are constantly varied, between zero and a value equal to the respective major axes, as a sine function; and measuring means operatively associated with said scanning means, and operable to measure the time interval between the value zero of the minor axis of the scanning ellipse and the instant the respective scanning ellipse intersects the image, to provide a direct measure of the magnitude of an axis deviation angle.

3. Apparatus for determining deviation angles of the axis of a camera-lens system, intended to be aligned on a celestial body, with respect to the line intersecting the celestial body and the center of the lens, said apparatus comprising, in combination, a television camera including a picture tube having a picture screen whose screen axis constitutes the axis to be aligned; a wide angle optical system for producing, on said screen, an image of the celestial body and including said lens; scanning means operatively associated with said screen and effective to scan the same alternately with first and second families of ellipses whose major axes are equal and constant in length and perpendicular to each other and whose minor axes are constantly varied between zero and a value equal to the respective major axes, as a sine function; and measuring means operatively associated with said scanning means, and operable to measure the time interval between the value zero of the minor axis of a scanning ellipse and the instant the respective scanning ellipse intersects the image to provide a direct measure of the magnitude of an axis deviation angle.

4. Apparatus for determining deviation angles of the axis of a camera-lens system, intended to be aligned on a celestial body, with respect to the line intersecting the celestial body and the center of the lens, said apparatus comprising, in combination, a television camera including a picture tube having a picture screen whose screen axis constitutes the axis to be aligned; means for producing, on said screen, an image of the celestial body; scanning means operatively associated with said screen and effective to scan the same alternately with first and second families of ellipses whose major axes are equal and constant in length and perpendicular to each other and whose minor axes are constantly varied between zero and a value equal to the respective major axes, as a sine function; measuring means operatively associated with scanning means, and operable to measure the time interval between the value zero of the minor axis of the scanning ellipse and the instant the respective scanning ellipse intersects the image to provide a direct measure of the magnitude of an axis deviation angle; and pulse producing means operatively associated with said measuring means and effective to convert the measured time intervals into pulses whose durations correspond to respective measured time intervals.

5. Apparatus for determining deviation angles of the axis of a camera-lens system, intended to be aligned on a celestial body, with respect to the line intersecting the celestial body and the center of the lens, said apparatus comprising, in combination, a television camera including a picture tube having a picture screen whose screen axis constitutes the axis to be aligned; optical means for producing, on said picture screen, an image of the celestial body and including said lens; scanning means operatively associated with said screen and operable to scan the latter alternately with first and second families of ellipses whose major axes are equal and constant in length and perpendicular to each other and whose minor axes are constantly varied between zero and a value equal to the respective major axes as a sine function; each of said families of ellipses scanning along a respective coordinate of a pair of perpendicularly related coordinates; measuring means operatively associated with said scanning means and effective to measure the time interval between the value zero of the minor axis of the scanning ellipse and the instant the respective scanning ellipse intersects the image, to determine the direct measure of the magnitude of an axis deviation angle with respect to its associated coordinate; said measuring means producing output pulses each having a duration corresponding to the measured magnitude of an axis deviation angle; pulse integrating means connected to the output of said measuring means to integrate said pulses; and pulse differentiation means connected to the output of said integrating means to differentiate the output pulses with respect to the respective coordinates.

6. Apparatus for determining deviation angles of the axis of a camera-lens system, intended to be aligned on a celestial body, with respect to the line intersecting the celestial body and the center of the lens, said apparatus comprising, in combination, a television camera including a picture tube having a picture screen whose screen axis constitutes the axis to be aligned, and further including a pair of X-deflection plates and a pair of Y-deflection plates; optical means for producing, on said screen, an image of the celestial body, and including said lens; said image migrating on said screen in accordance with the deviation angles of said axis; scanning means applying, to said pair of X-deflection plates, a sweep voltage modulated by a series of positive half-waves of a sinusoidal deflection voltage alternating with rectangular pulses, said half waves and pulses having equal amplitudes and periods; scanning means applying, to said pair of Y-deflection plates, a sweep voltage displaced by 90° and modulated by said half-waves of said sinusoidal deflection voltage phase displaced by 180°; said scanning means producing first and second families of ellipses whose major axes are equal and constant in length and perpendicular to each other and whose minor axes are constantly varied, between zero and a value equal to the respective major axes, as a sine function;

and measuring means operatively associated with said scanning means, and operable to measure the time interval between value zero of the minor axis of a scanning ellipse and the instant a respective scanning ellipse intersects the image, as the direct measure of the magnitude of an axis deviation angle.

7. Apparatus for determining deviation angles of the axis of a camera-lens system, intended to be aligned on a celestial body, with respect to the line intersecting the celestial body and the center of the lens, said apparatus comprising, in combination, a television camera including a picture tube having a picture screen whose screen axis constitutes the axis to be aligned, and further including a pair of X-deflection plates and a pair of Y-deflection plates; optical means for producing, on said screen, an image of the celestial body, and including said lens said image migrating on said screen in accordance with the deviation angles of said axis; scanning means applying, to said pair of X-deflection plates, a sweep voltage modulated by a series of positive half-waves of a sinusoidal deflection voltage alternating with rectangular pulses, said half waves and pulses having equal amplitudes and periods; scanning means applying, to said pair of Y-deflection plates, a sweep voltage displaced by 90° and modulated by said half-waves of said sinusoidal deflection voltage phase displaced by 180°; the frequency of said rectangular pulses being small in relation to the frequency of said sinusoidal deflection voltage; said scanning means producing first and second families of ellipses whose major axes are equal and constant in length and perpendicular to each other and whose minor axes are constantly varied, between zero and a value equal to the respective major axes, as a sine function; and measuring means operatively associated with said scanning means, and operable to measure the time interval between value zero of the minor axis of a scanning ellipse and the instant a respective scanning ellipse intersects the image, as the direct measure of the magnitude of an axis deviation angle.

8. Apparatus for determining deviation angles of the axis of a camera-lens system, intended to be aligned on a celestial body, with respect to the line intersecting the celestial body and the center of the lens, said apparatus comprising, in combination, a television camera including a picture tube having a picture screen whose screen axis constitutes the axis to be aligned, and further including a pair of X-deflection plates and a pair of Y-deflection plates; optical means for producing, on said screen, an image of the celestial body, and including said lens said image migrating on said screen in accordance with the deviation angles of said axes; scanning means applying, to said pair of X-deflection plates, a sweep voltage modulated by a series of positive half-waves of a sinusoidal deflection voltage alternating with rectangular pulses, said half waves and pulses having equal amplitudes and periods; scanning means applying, to said pair of Y-deflection plates, a sweep voltage displaced by 90° and modulated by said half-waves of said sinusoidal deflection voltage phase displaced by 180°; the frequency of said sinusoidal deflection voltage having a value such that the scanning speed of said picture screen is very great in relation to the migration speed of said image of said celestial body; said scanning means producing first and second families of ellipses whose major axes are equal and constant in length and perpendicular to each other and whose minor axes are constantly varied, between zero and a value equal to the respective major axes, as a sine function; and measuring means operatively associated with said scanning means, and operable to measure the time interval between value zero of the minor axis of a scanning ellipse and the instant a respective scanning ellipse intersects the image, as the direct measure of the magnitude of an axis deviation angle.

9. Apparatus for determining deviation angles of the axis of a camera-lens system, intended to be aligned in the celestial body, with respect to the line intersecting the celestial body and the center of the lens, said apparatus comprising, in combination, a television camera including a picture tube having a picture screen whose screen axis constitutes the axis to be aligned and further including a pair of X-deflection plates and a pair of Y-deflection plates for scanning of said picture screen; a first sine generator; a frequency stable trigger controlling said first sine generator; a first modulation stage connecting said first sine generator to said pair of X-deflection plates; a 90° phase shifter and a second modulation stage connecting said first sine generator to said pair of Y-deflection plates; a frequency reducer connected to said frequency stable trigger; a modulation sine generator connected to the output of said reducer for control by said frequency stable trigger; said frequency reducer reducing the trigger frequency by substantially 50%; a bi-stable deflection multivibrator connected to said frequency reducer; a first mixer stage connected to the output of said modulation sine generator and an output of said bi-stable deflection multivibrator, and connected to the input of said first modulation stage; a second mixer stage connected to the output of said modulation sine generator and to the other output of said bi-stable deflection multivibrator; a reversing stage connected between said second mixing stage and said second modulation stage; the scanning of said picture screen producing first and second families of ellipses whose major axes are equal and constant in length and perpendicular to each other and whose minor axes are constantly varied, between zero and a value equal to the respective major axes, as a sine function; and measuring means operatively associated with said scanning means and operable to measure the time intervals between the value zero of the minor axis of the scanning ellipse and the instant the respective ellipse intersects the image, as a direct measure of the magnitude of an axis deviation angle.

10. Apparatus for determining deviation angles of the axis of a camera-lens system, intended to be aligned in the celestial body, with respect to the line intersecting the celestial body and the center of the lens, said apparatus comprising, in combination, a television camera including a picture tube having a picture screen whose screen axis constitutes the axis to be aligned and further including a pair of X-deflection plates and a pair of Y-deflection plates for scanning of said picture screen; a first sine generator; a frequency stable trigger controlling said first sine generator; a first modulation stage connecting said first sine generator to said pair of X-deflection plates; a 90° phase shifter and a second modulation stage connecting said first sine generator to said pair of Y-deflection plates; a frequency reducer connected to said frequency stable trigger; a modulation sine generator connected to the output of said reducer for control by said frequency stable trigger; said frequency reducer reducing the trigger frequency by substantially 50%; a bi-stable deflection multivibrator connected to said frequency reducer; a first mixer stage connected to the output of said modulation sine generator and an output of said bi-stable deflection multivibrator, and connected to an input of said first modulation stage; a second mixer stage connected to the output of said modulation sine generator and to the other output of said bi-stable deflection multivibrator; a reversing stage connected between said second mixing stage and said second modulation stage; a bi-stable signal multivibrator; means connecting said bi-stable signal multivibrator to said reducer; means connecting said bi-stable signal multivibrator to the output of said television camera; the scanning of said picture screen producing first and second families of ellipses whose major axes are equal and constant in length and perpendicular to each other and whose minor axes are constantly varied, between zero and a value equal to the respective major axes, as a sine function; and measuring means operatively associated with said scanning means and operable to measure the time intervals between the value zero of the minor axis of the scanning ellipse and the instant the respective ellipse intersects the image, as a direct measure of the magnitude of an axis deviation angle.

11. Apparatus for determining deviation angles of the axis of a camera-lens system, intended to be aligned in the celestial body, with respect to the line intersecting the celestial body and the center of the lens, said apparatus comprising, in combination, a television camera including a picture tube having a picture screen whose screen axis constitutes the axis to be aligned and further including a pair of X-deflection plates and a pair of Y-deflection plates for scanning of said picture screen; a first sine generator; a frequency stable trigger controlling said first sine generator; a first modulation stage connecting said first sine generator to said pair of X-deflection plates; a 90° phase shifter and a second modulation stage connecting said first sine generator to said pair of Y-deflection plates; a frequency reducer connected to said frequency stable trigger; a modulation sine generator connected to the output of said reducer for control by said frequency stable trigger; said frequency reducer reducing the trigger frequency by substantially 50%; a bi-stable deflection multivibrator connected to said frequency reducer; a first mixer stage connected to the output of said modulation sine generator and an output of said bi-stable deflection multivibrator, and connected to an input of said first modulation stage; a second mixer stage connected to the output of said modulation sine generator and to the other output of said bi-stable deflection multivibrator; a reversing stage connected between said second mixing stage and said second modulation stage; a bi-stable signal multivibrator; means connecting said bi-stable signal multivibrator to said reducer; means connecting said bi-stable signal multivibrator to the output of said television camera; a Miller integrator connected to the output of said bi-stable signal multivibrator; differentiation means connected to the output of said Miller integrator; a pair of gates commonly connected to the output of said differentiation means; means connecting said gates to respective outputs of said bi-stable deflection multivibrator for control by the latter; the scanning of said picture screen producing first and second families of ellipses whose major axes are equal and constant in length and perpendicular to each other and whose minor axes are constantly varied, between zero and a value equal to the respective major axes, as a sine function; and measuring means operatively associated with said scanning means and operable to measure the time intervals between the value zero of the minor axes of the scanning ellipse and the instant the respective ellipse intersects the image, as a direct measure of the magnitude of an axis deviation angle.

12. Apparatus for determining deviation angles of the axis of a camera-lens system, intended to be aligned in the celestial body, with respect to the line intersecting the celestial body and the center of the lens, said apparatus comprising, in combination, a television camera including a picture tube having a picture screen whose screen axis constitutes the axis to be aligned and further including a pair of X-deflection plates and a pair of Y-deflection plates for scanning of said picture screen; a first sine generator; a frequency stable trigger controlling said first sine generator; a first modulation stage connecting said first sine generator to said pair of X-deflection plates; a 90° phase shifter and a second modulation stage connecting said first sine generator to said pair of Y-deflection plates; a frequency reducer connected to said frequency stable trigger; a modulation sine generator connected to the output of said reducer for control by said frequency stable trigger; said frequency reducer reducing the trigger frequency by substantially 50%; a bi-stable deflection multivibrator connected to said frequency reducer; a first mixer stage connected to the output of said modulation sine generator and an output of said bi-stable deflection multivibrator, and connected to an input of said first modulation stage; a second mixer stage connected to the output of said modulation sine generator and to the other of said bi-stable deflection multivibrator; a reversing stage connected between said second mixing stage and said second modulation stage; a bi-stable signal multivibrator; means connecting said bi-stable signal multivibrator to said reducer; means connecting said bi-stable signal multivibrator to the output of said television camera; a Miller integrator connected to the output of said bi-stable signal multivibrator; differentiation means connected to the output of said Miller integrator; a pair of gates commonly connected to the output of said differentiation means; means connecting said gates to respective outputs of said bi-stable deflection multivibrator for control by the latter; a pair of second gates connected to the output of one of said first mentioned gates; a pair of third gates connected to the output of the other of said first mentioned gates; means connecting said second gates to said first sine generator for control by the latter; and means connecting said third gates to said first sine generator through said 90° phase shifter for control by said first sine generator through said 90° phase shifter; the outputs of said second and third gates providing voltages proportional to the measured magnitudes of the axis deviation angles.

13. Apparatus for determining deviation angles of the axis of a camera-lens system, intended to be aligned on a celestial body, with respect to the line intersecting the celestial body and the center fo the lens, said apparatus comprising, in combination, a television camera including a picture tube having a picture screen whose screen axis constitutes the axis to be aligned and further including a pair of X-deflection plates and a pair of Y-deflection plates; optical means for producing, on said screen, an image of the celestial body and including said lens, said image migrating on said screen in accordance with the deviation angles of said axis; scanning means applying, to said pair of X-deflection plates, a sweep voltage modulated by a series of positive half-waves of a sinusoidal deflection voltage alternating with rectangular pulses, said half-waves and pulses having equal amplitudes and periods; scanning means applying, to said pair of Y-deflection plates, a sweep voltage displaced by 90° and modulated by said half-waves of said sinusoidal deflection voltage phase displaced by 180°; said scanning means producing first and second families of ellipses whose major axes are equal and constant in length and perpendicular to each other and whose minor axes are constantly varied, between zero and a value equal to the respective major axes, as a sine function; and measuring means operatively associated with said scanning means and operable to measure of the time interval between the value zero of the minor axis of a scanning ellipse and the instant the respective scanning ellipse intersects the image, as a direct measure of the magnitude of an axis deviation angle; said picture tube screen being overmodulated by the ellipses whereby said screen is scanned by segments of said ellipses.

No references cited.

JEWELL H. PEDERSEN, *Primary Examiner.*

RONALD L. WIBERT, *Examiner.*

E. S. BAUER, *Assistant Examiner.*